(12) United States Patent
Okada

(10) Patent No.: US 8,643,924 B2
(45) Date of Patent: Feb. 4, 2014

(54) TWO-DIMENSIONAL OPTICAL SCANNER AND LIGHT STIMULUS APPARATUS

(75) Inventor: Naobumi Okada, Asaka (JP)

(73) Assignee: Olympus Corporation, Tokyo (JP)

( * ) Notice: Subject to any disclaimer, the term of this patent is extended or adjusted under 35 U.S.C. 154(b) by 177 days.

(21) Appl. No.: 13/366,574

(22) Filed: Feb. 6, 2012

(65) Prior Publication Data

US 2012/0212791 A1 Aug. 23, 2012

(30) Foreign Application Priority Data

Feb. 18, 2011 (JP) ................... 2011-033788

(51) Int. Cl.
*G02B 26/08* (2006.01)
(52) U.S. Cl.
USPC ............... 359/202.1; 359/201.1; 359/211.3
(58) Field of Classification Search
USPC .................... 359/201.1, 202.1, 305
See application file for complete search history.

(56) References Cited

U.S. PATENT DOCUMENTS

| | | | | |
|---|---|---|---|---|
| 5,936,767 A | * | 8/1999 | Favalora | 359/462 |
| 7,221,503 B2 | * | 5/2007 | Eberhardt et al. | 359/385 |
| 2007/0295892 A1 | | 12/2007 | Kanegae et al. | |

FOREIGN PATENT DOCUMENTS

JP 2008-26885 A 2/2008

OTHER PUBLICATIONS

J. Xu et al; Acousto-Optic Devices: Principles, Design and Applications, ISBN 0-471-61638-9; pp. 617-626; 1992.
A.P. Goutzoulis et al; "Design and Fabrication of Acousto-Optic Devices", ISBN 0-8247-8930-X; pp. 69-123; 1994.

* cited by examiner

*Primary Examiner* — James Phan
(74) *Attorney, Agent, or Firm* — Holtz, Holtz, Goodman & Chick, PC

(57) ABSTRACT

Two-dimensional optical scanner includes: a first acousto-optical deflector (AOD) and a second AOD that deflects light according to a signal; a first driving unit that rotates the first AOD around axis perpendicular to a first plane including the light on and light from the first AOD; a first prism that is arranged adjacent to an emission end of the first AOD and compensates angular dispersion of the light; a second driving unit that rotates the second AOD around axis perpendicular to a second plane including the light on and light from the second AOD and perpendicular to the first plane; a second prism that is arranged adjacent to an emission end of the second AOD and compensates angular dispersion of the light; and a relay lens that allows the emission end of the first AOD and an incident end of the second AOD to be optically conjugate.

8 Claims, 7 Drawing Sheets

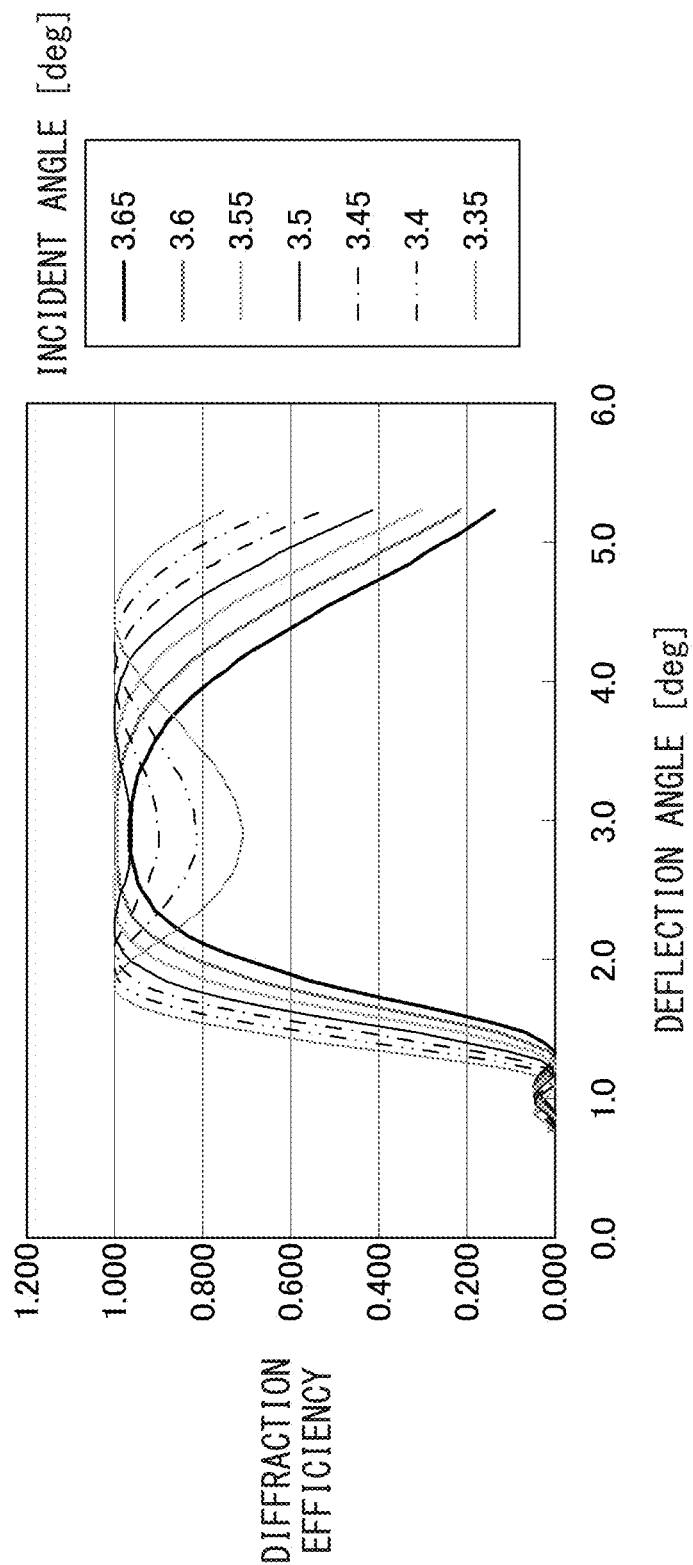
F I G. 4

TWO-DIMENSIONAL OPTICAL SCANNER AND LIGHT STIMULUS APPARATUS

CROSS REFERENCE TO RELATED APPLICATIONS

This application is based upon and claims the benefit of priority from the prior Japanese Patent Application No. 2011-033788, filed Feb. 18, 2011, the entire contents of which are incorporated herein by this reference.

BACKGROUND OF THE INVENTION

1. Field of the Invention

The present invention relates to a technique of a two-dimensional optical scanner and a light stimulus apparatus, and more particularly, to a technique of a two-dimensional optical scanner and a light stimulus apparatus including an acousto-optical deflector (AOD).

2. Description of the Related Art

Light stimulation means irradiation of a small region of a cell or a reagent with light such as a laser beam by using an optical device such as a microscope. The light stimulation is performed so as to observe or measure a reaction by the light irradiation.

A light stimulus apparatus includes a two-dimensional optical scanner so as to irradiate a desired position with light. In a general light stimulus apparatus for microscopes, a galvanomirror that controls an irradiated position by controlling the angle of a mirror is used as the two-dimensional optical scanner.

For example, the light stimulus apparatus is used in an experiment of stimulating nerve cells. In the experiment of stimulating nerve cells, a plurality of separate regions (nerve cells) need to be stimulated by switching the regions at high speed. However, it is difficult for the light stimulus apparatus including the galvanomirror to sufficiently meet such demands. In the galvanomirror, the angle of the mirror is continuously changed. Thus, normally, the irradiated position is also continuously moved. Therefore, it is difficult for the light stimulus apparatus including the galvanomirror to stimulate the plurality of separate regions without stimulating other regions by discontinuously changing the irradiated position.

In view of the above technical problem, a light stimulus apparatus including an acousto-optical deflector as the two-dimensional optical scanner instead of the galvanomirror has been proposed. The light stimulus apparatus including the acousto-optical deflector is disclosed in Japanese Patent Laid-Open No. 2008-26885, for example.

The acousto-optical deflector includes a crystal of tellurium dioxide or the like, and a transducer such as a piezoelectric element attached to the crystal. The transducer propagates an acoustic wave through the crystal, to thereby cause unevenness in the refractive index with respect to light. The acousto-optical deflector can thereby deflect incident light by acting as a diffraction grating with respect to the incident light. Also, since the deflection direction of emission light is changed depending on the frequency of a high-frequency signal applied to the transducer, the acousto-optical deflector can discontinuously change an irradiated position.

Accordingly, the light stimulus apparatus including the acousto-optical deflector can stimulate a plurality of separate regions by switching the regions at high speed.

SUMMARY OF THE INVENTION

According to one aspect of the present invention, a two-dimensional optical scanner includes: a first acousto-optical deflector that deflects incident light according to a control signal from outside; a first driving unit that rotates the first acousto-optical deflector around a rotational axis perpendicular to a first plane including the incident light on the first acousto-optical deflector and emission light from the first acousto-optical deflector; a first prism that is arranged adjacent to an emission end of the first acousto-optical deflector and compensates angular dispersion of the emission light from the first acousto-optical deflector; a second acousto-optical deflector that deflects incident light according to a control signal from outside; a second driving unit that rotates the second acousto-optical deflector around a rotational axis perpendicular to a second plane including the incident light on the second acousto-optical deflector and emission light from the second acousto-optical deflector; a second prism that is arranged adjacent to an emission end of the second acousto-optical deflector and compensates angular dispersion of the emission light from the second acousto-optical deflector; and a relay lens that allows the emission end of the first acousto-optical deflector and an incident end of the second acousto-optical deflector to be optically conjugate with each other, wherein the first acousto-optical deflector and the second acousto-optical deflector are arranged such that the first plane and the second plane are perpendicular to each other.

BRIEF DESCRIPTION OF THE DRAWINGS

The present invention will be more apparent from the following detailed description when the accompanying drawings are referenced.

FIG. 4 is a graph illustrating the incident angle dependence of the diffraction efficiency of the acousto-optical deflector;

DESCRIPTION OF THE PREFERRED EMBODIMENTS (Embodiment 1)

Figure 1:
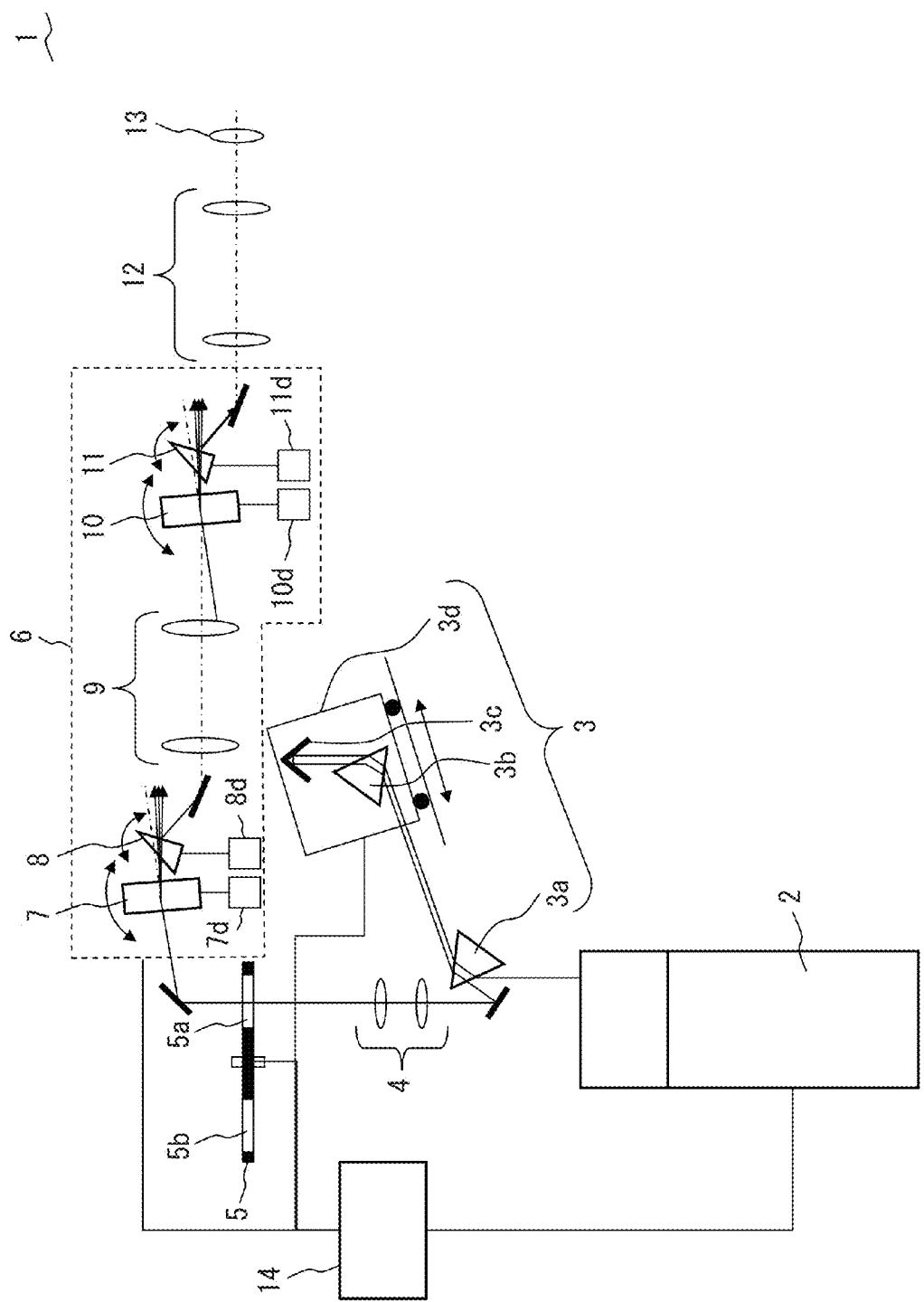
FIG. 1 is a view illustrating an example of the configuration of a light stimulus apparatus according to Embodiment 1.
Figure 2:
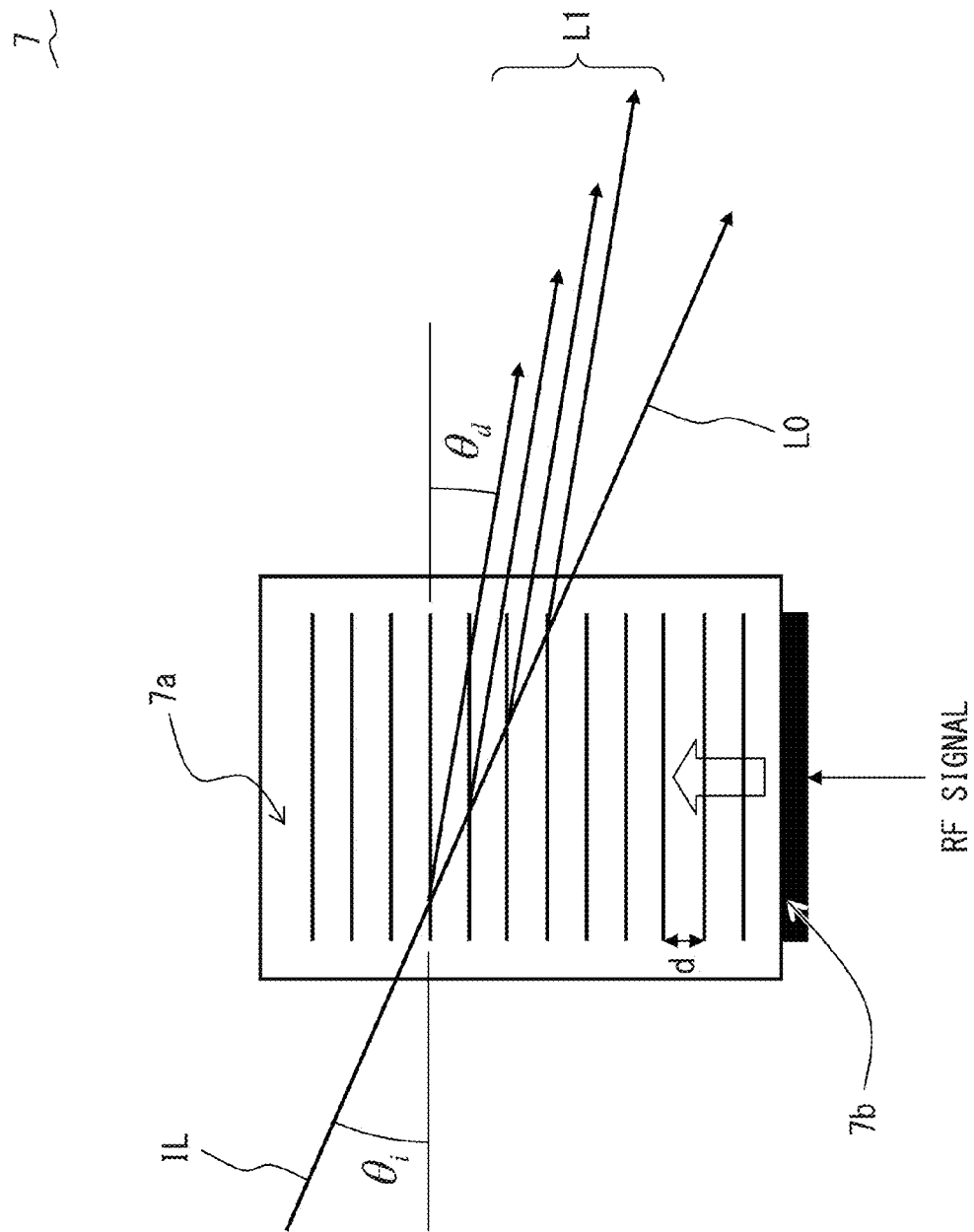
FIG. 2 is a view for explaining an acousto-optical deflector in the light stimulus apparatus illustrated in FIG. 1.

FIG. 1 is a view illustrating an example of the configuration of a light stimulus apparatus according to a present embodiment. FIG. 2 is a view for explaining an acousto-optical deflector (referred to as AOD below) in the light stimulus apparatus according to the present embodiment. The light stimulus apparatus 1 illustrated in FIG. 1 includes a femtosecond laser 2, a time dispersion compensating mechanism 3, a beam expander 4, a filter wheel 5 to which a plurality of bandpass filters (a bandpass filter 5a and a bandpass filter 5b) are mounted, a two-dimensional optical scanner 6 including the AOD, a relay lens 12, an objective lens 13, and a control device 14.

The femtosecond laser 2 is an ultrashort optical pulse laser that produces ultrashort optical pulses with a pulse duration on the order of femtoseconds. The femtosecond laser 2 can selectively emit laser beams having a plurality of center wavelengths. The laser beam having each center wavelength includes light having wavelengths in a predetermined range centering on the center wavelength. In the following, the width of wavelengths included in the laser beam having each center wavelength is referred to as bandwidth.

The time dispersion compensating mechanism 3 includes two prisms (a prism 3a and a prism 3b), a mirror 3c, and a motorized stage 3d. The prism 3b and the mirror 3c are arranged on the motorized stage 3d. The motorized stage 3d is a stage which can move along the incident optical axis of light entering the prism 3b from the prism 3a.

The two-dimensional optical scanner 6 includes an AOD 7 (a first acousto-optical deflector) that deflects incident light according to a control signal from outside, a driving unit 7d (a first driving unit) that rotates the AOD 7 around a rotational axis perpendicular to a first plane including the incident light on the AOD 7 and emission light from the AOD 7, a prism 8 (a first prism) that is arranged adjacent to an emission end of the AOD 7 and compensates angular dispersion of the emission light from the AOD 7, a driving unit 8d (a third driving unit) that rotates the prism 8 around a rotational axis perpendicular to the first plane, an AOD 10 (a second acousto-optical deflector) that deflects incident light according to a control signal from outside, a driving unit 10d (a second driving unit) that rotates the AOD 10 around a rotational axis perpendicular to a second plane including the incident light on the AOD 10 and emission light from the AOD 10, a prism 11 (a second prism) that is arranged adjacent to an emission end of the AOD 10 and compensates angular dispersion of the emission light from the AOD 10, a driving unit 11d (a fourth driving unit) that rotates the prism 11 around a rotational axis perpendicular to the second plane, and a relay lens 9 that allows the emission end of the AOD 7 and an incident end of the AOD 10 to be optically conjugate with each other. The emission end of the AOD 10 and a pupil position of the objective lens 13 are optically conjugate with each other by the relay lens 12.

As shown in FIG. 2, the AOD 7 includes a crystal 7a of tellurium dioxide or the like, and a piezoelectric element 7b attached to the crystal 7a, for example. An acoustic wave is propagated through the crystal 7a by an RF signal (the control signal) input into the piezoelectric element 7b, to thereby cause unevenness in the refractive index in the crystal 7a. Accordingly, the AOD 7 acts as a diffraction grating with respect to incident light IL. The incident light IL entering the AOD 7 at an incident angle $\theta i$ is diffracted at the AOD 7, and its primary diffracted light L1 is emitted from the AOD 7 at an emission angle $\theta d$. The emission angle $\theta d$ can be controlled by controlling a frequency of the RF signal. It is because the period of unevenness of the refractive index changes by changing the frequency of the RF signal, and the AOD 7 thereby acts as a diffraction grating having a different grating constant. The intensity of the emission light can be also controlled by controlling the amplitude of the RF signal. The AOD 10 has the same configuration as the AOD 7.

The AOD 7 and the AOD 10 are arranged such that the first plane and the second plane are perpendicular to each other. That is, the AOD 7 and the AOD 10 are arranged such that a plane where the emission lights emitted from the AOD 7 at different deflection angles are distributed (a deflection surface of the AOD 7) and a plane where the emission lights emitted from the AOD 10 at different deflection angles are distributed (a deflection surface of the AOD 10) are perpendicular to each other. Accordingly, a position on a sample S to be irradiated with light can be controlled to any position on a two-dimensional plane perpendicular to the optical axis of the objective lens 13 by controlling the control signals for the AOD 7 and the AOD 10.

While both the rotational axis of the AOD 7 and the rotational axis of the prism 8 are perpendicular to the first plane (the deflection surface of the AOD 7), the rotational axes are provided at different positions on the first plane. While both the rotational axis of the AOD 10 and the rotational axis of the prism 11 are perpendicular to the second plane (the deflection surface of the AOD 10), the rotational axes are provided at different positions on the second plane. For example, a stepping motor may be used as the driving unit 7d, the driving unit 8d, the driving unit 10d, and the driving unit 11d.

The control device 14 is connected at least to the femtosecond laser 2, the time dispersion compensating mechanism 3, the filter wheel 5, and the two-dimensional optical scanner 6. The control device 14 controls the time dispersion compensating mechanism 3, the filter wheel 5, and the two-dimensional optical scanner 6 according to the selected center wavelength of the laser beam emitted from the femtosecond laser 2.

In the light stimulus apparatus 1 having the above configuration, the laser beam emitted from the femtosecond laser 2 first enters the time dispersion compensating mechanism 3. The laser beam entering the time dispersion compensating mechanism 3 is reflected by the mirror 3c after passing through the prisms 3a and 3b. The laser beam is emitted from the time dispersion compensating mechanism 3 after passing through the prisms 3b and 3a again. The time dispersion compensating mechanism 3 thereby causes negative group delay dispersion in the laser beam.

While the femtosecond laser 2 emits the laser beam having a predetermined bandwidth, the femtosecond laser 2 brings light waves having respective wavelengths included in the laser beam in phase with each other, and thereby generates an ultrashort optical pulse with a narrow pulse duration as a combined wave thereof. However, when the ultrashort optical pulse passes through a dispersing medium having different refractive indexes with respect to each wavelength such as the AOD 7 and the AOD 10, the light waves having respective wavelengths are out of phase due to the difference in the refractive index, and the pulse duration is extended with a change in the waveform of the combined wave. As a result, stimulus intensity is decreased. Dispersion causing the deformation of the pulse waveform is called group delay dispersion (GDD).

In the light stimulus apparatus 1, the group delay dispersion caused in other than the time dispersion compensating mechanism 3 can be compensated by preliminarily causing the negative group delay dispersion in the laser beam by the time dispersion compensating mechanism 3. Accordingly, the light stimulus apparatus 1 can suppress the decrease in the stimulus intensity due to the group delay dispersion.

The amount of group delay dispersion caused in the light stimulus apparatus 1 differs depending on the center wavelength of the laser beam emitted from the femtosecond laser 2. Therefore, the control device 14 controls the time dispersion compensating mechanism 3 such that a necessary amount of negative group delay dispersion is caused based on the center wavelength of the laser beam. To be more specific, the control device 14 adjusts a distance between the prism 3a and the prism 3b by moving the motorized stage 3d. Accordingly, even when the plurality of laser beams having different center wavelengths are selectively used, the light stimulus apparatus 1 can suppress the decrease in the stimulus intensity due to the group delay dispersion.

The laser beam passing through the time dispersion compensating mechanism 3 enters the beam expander 4. The beam expander 4 expands the beam size according to the pupil diameter of the objective lens 13. The laser beam passing through the beam expander 4 enters the bandpass filter 5a that is a wavelength selection filter mounted to the filter wheel 5 to transmit light having a wavelength in a predetermined range. The bandpass filter 5a reduces the bandwidth of the laser beam. Although the pulse duration of the ultrashort optical pulse generated as the combined wave is extended as the bandwidth is reduced, the degree of extension is smaller than the extension of the pulse duration due to the group delay dispersion, and the influence thereof is also small in general.

The deflection amount of the laser beam by the AOD 7 and the AOD 10 in the two-dimensional optical scanner 6 differs depending on the wavelength. Thus, the light waves having different wavelengths included in the laser beam are delivered to different positions on the sample S. The spot size of the laser beam at a surface where the sample S is arranged becomes larger as the bandwidth of the laser beam is wider. As a result, the stimulus intensity or stimulus spatial resolution is decreased.

In the light stimulus apparatus 1, the bandpass filter 5a mounted to the filter wheel 5 limits the wavelength of the light transmitted therethrough and thereby adjusts the bandwidth, so that the spot size can be prevented from becoming larger. Accordingly, the light stimulus apparatus 1 can suppress the decrease in the stimulus intensity and the stimulus spatial resolution caused when the laser beam emitted from the femtosecond laser 2 has a relatively wide bandwidth.

Figure 3:
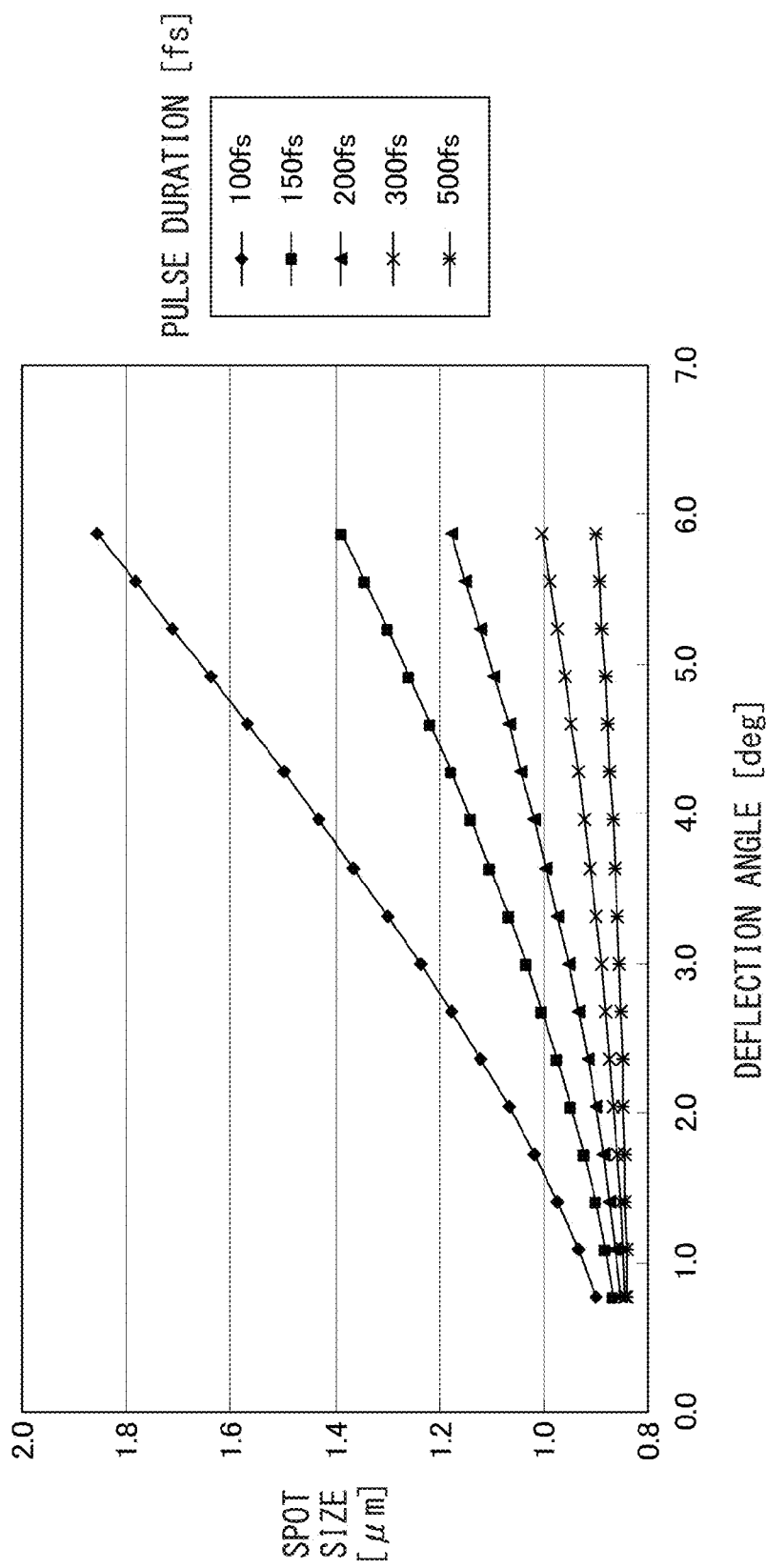
FIG. 3 is a graph illustrating an example of the effect of a bandpass filter in the light stimulus apparatus illustrated in FIG. 1.

FIG. 3 is a view illustrating an example of the effect of the bandpass filter in the light stimulus apparatus illustrated in FIG. 1. FIG. 3 illustrates a case in which the center wavelength of the laser beam is 720 nm. As illustrated in FIG. 3, when the center wavelength is constant, an increase in the spot size caused by an increase in the deflection angle is reduced as the pulse duration is larger, that is, as the bandwidth is narrower. Therefore, the decrease in the stimulus intensity and the stimulus spatial resolution can be suppressed by using the bandpass filter 5a.

The wavelength band included in the laser beam differs depending on the center wavelength of the laser beam emitted from the femtosecond laser 2. Therefore, the control device 14 switches the bandpass filters having different transmission regions according to the center wavelength of the laser beam emitted from the femtosecond laser 2. To be more specific, the control device 14 controls the rotation of the filter wheel 5 such that the bandpass filter having a narrower transmission region than the bandwidth centering on the center wavelength of the laser beam is arranged on the optical path. Accordingly, even when the plurality of laser beams having different center wavelengths are selectively used, the light stimulus apparatus 1 can suppress the decrease in the stimulus intensity and the stimulus spatial resolution caused when the laser beam has a relatively wide bandwidth.

The laser beam passing through the bandpass filter 5a enters the AOD 7 in the two-dimensional optical scanner 6. The AOD 7 deflects the incident light according to the control signal from outside. To be more specific, the AOD 7 deflects the incident light in a deflection direction according to the frequency of the control signal at intensity according to the amplitude of the control signal.

The diffraction efficiency of the AOD 7 differs depending on the incident angle as illustrated in FIG. 4, and also depending on the incident wavelength. That is, the diffraction efficiency differs depending on the incident angle and the incident wavelength (mainly, the center wavelength). Therefore, the control device 14 controls the incident angle of the laser beam entering the AOD 7 according to the center wavelength of the laser beam. More specifically, the control device 14 causes the driving unit 7d to rotate the AOD 7, and thereby adjusts the incident angle according to the center wavelength of the laser beam. Accordingly, even when the plurality of laser beams having different center wavelengths are selectively used, the light stimulus apparatus 1 can always keep the diffraction efficiency of the AOD 7 high.

Figure 5A:
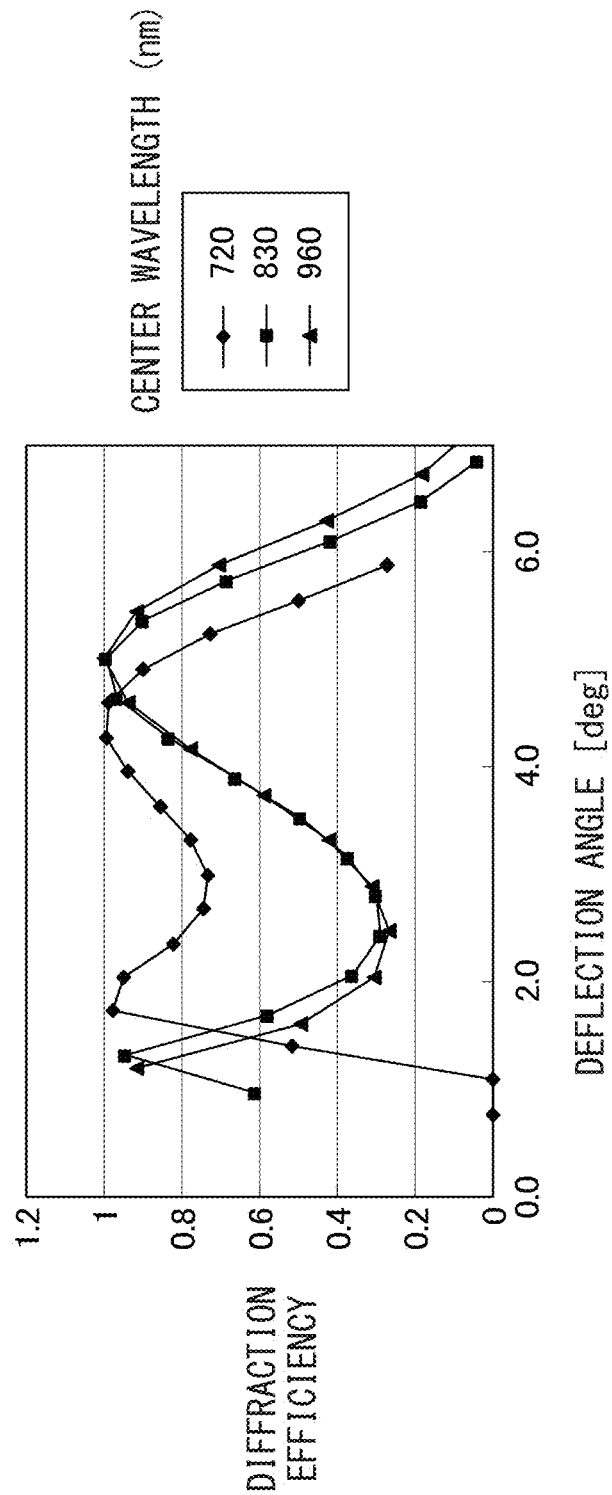
FIG. 5A is a graph illustrating an example of the effect by adjusting the incident angle of a laser beam entering the acousto-optical deflector in the light stimulus apparatus illustrated in FIG. 1, and shows the diffraction efficiency of the acousto-optical deflector with respect to each wavelength when the incident angle is constant.
Figure 5B:
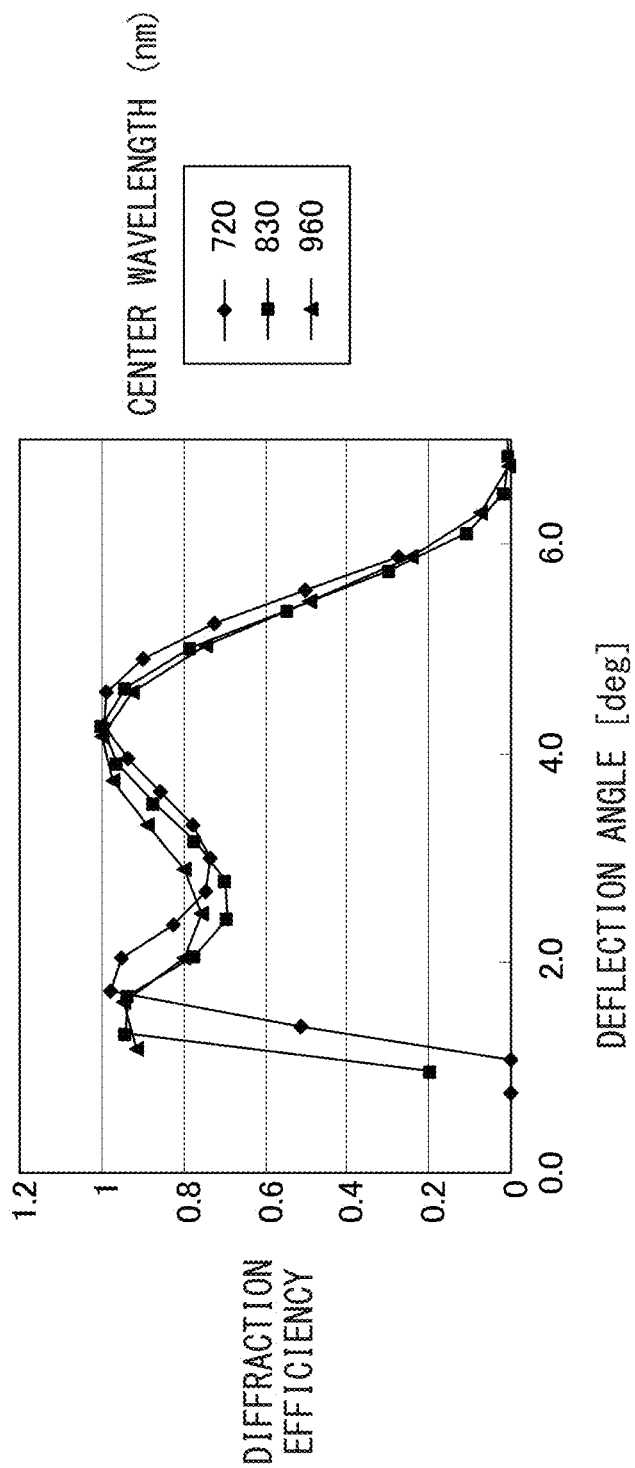
FIG. 5B is a graph illustrating an example of the effect by adjusting the incident angle of a laser beam entering the acousto-optical deflector in the light stimulus apparatus illustrated in FIG. 1, and shows the diffraction efficiency of the acousto-optical deflector with respect to each wavelength when the incident angle is adjusted with respect to each wavelength.

FIGS. 5A and 5B are graphs illustrating an example of the effect by adjusting the incident angle of the laser beam entering the acousto-optical deflector in the light stimulus apparatus illustrated in FIG. 1. FIG. 5A shows the diffraction efficiency of the AOD 7 with respect to each wavelength when the incident angle is constant. FIG. 5B shows the diffraction efficiency of the AOD 7 with respect to each wavelength when the incident angle is adjusted with respect to each wavelength. As illustrated in FIGS. 5A and 5B, the diffraction efficiency of the AOD 7 can be kept high regardless of the wavelength by adjusting the incident angle with respect to each wavelength as compared to the case in which the incident angle is constant.

The laser beam emitted from the AOD 7 enters the prism 8 arranged adjacent to the emission end of the AOD 7. The prism 8 is a triangular prism made of a high-dispersion glass material, for example.

Since the deflection amount of the laser beam in the AOD 7 differs depending on the wavelength, the laser beam having the bandwidth emitted from the AOD 7 has angular dispersion. Thus, the light waves having different wavelengths included in the laser beam are delivered to different positions on the sample S, so that the spot size of the laser beam becomes larger at the surface where the sample S is arranged. As a result, the stimulus intensity or the stimulus spatial resolution is decreased.

In the light stimulus apparatus 1, the angular dispersion of the laser beam emitted from the AOD 7 can be compensated by the prism 8 by arranging the prism 8 adjacent to the emission end of the AOD 7. Accordingly, the light stimulus apparatus 1 can suppress the decrease in the stimulus intensity and the stimulus spatial resolution caused when the laser beam emitted from the femtosecond laser 2 has a relatively wide bandwidth. A deterioration in the scanning performance of the two-dimensional optical scanner 6 caused when the laser beam has a relatively wide bandwidth can be also suppressed.

Figure 6:
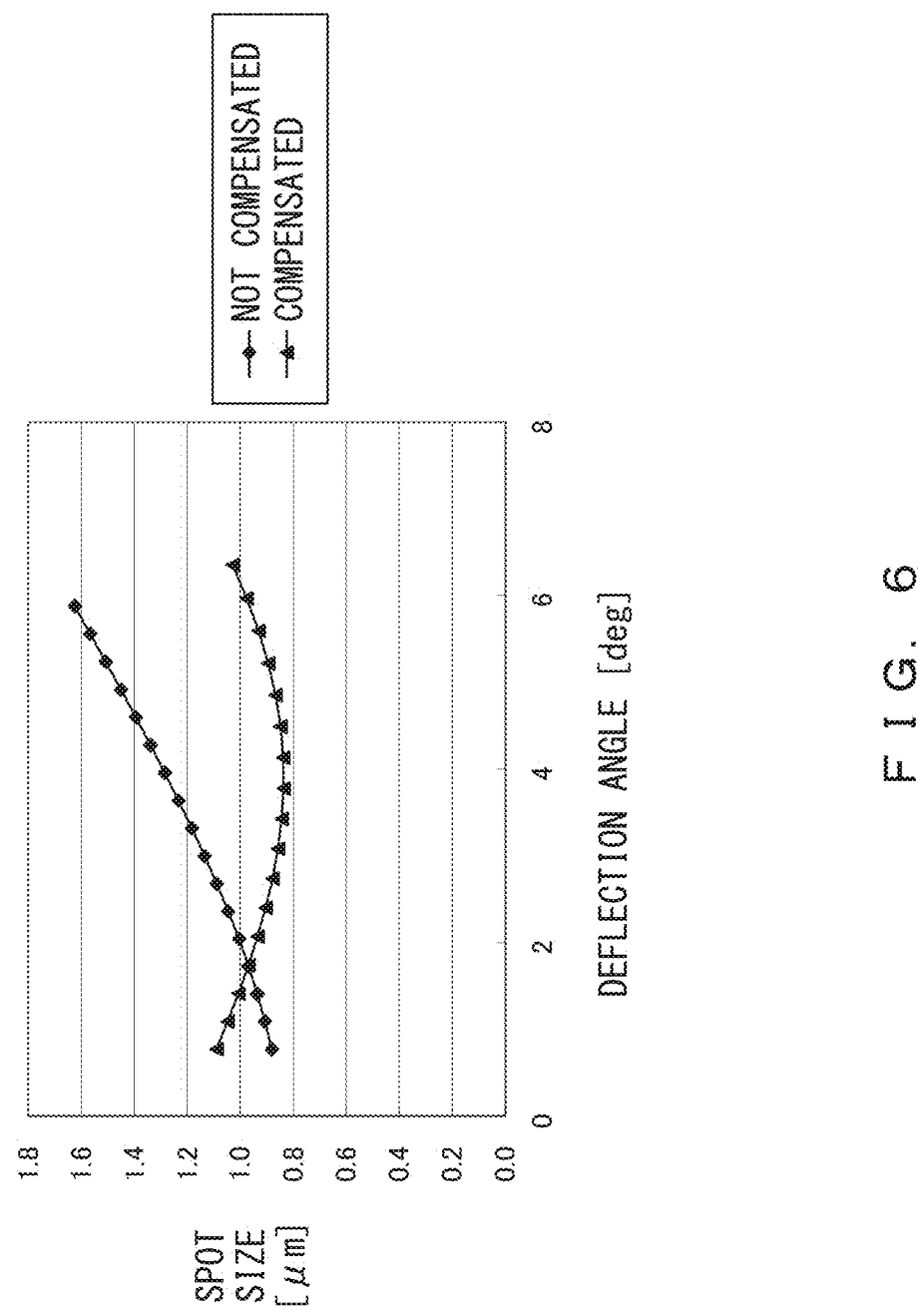
FIG. 6 is a graph illustrating the effect of a prism arranged adjacent to an emission end of the acousto-optical deflector in the light stimulus apparatus according to Embodiment 1.

FIG. 6 is a graph illustrating the effect of the prism arranged adjacent to the emission end of the acousto-optical deflector in the light stimulus apparatus according to the present embodiment. FIG. 6 illustrates a case in which the center wavelength of the laser beam is 720 nm. As illustrated in FIG. 6, when the prism 8 is not arranged adjacent to the emission end of the AOD 7 (not compensated), the spot size becomes larger as the deflection angle is larger. Thus, the stimulus intensity and the stimulus spatial resolution are decreased as the deflection angle is larger. Meanwhile, when the prism 8 is arranged (compensated), the spot size is kept small on the whole, and the uniformity of the spot size with respect to the deflection angle is improved. As described above, by arranging the prism 8 and thereby compensating the angular dispersion, the decrease in the stimulus intensity and the stimulus spatial resolution can be suppressed, and stable stimulus intensity and stimulus spatial resolution can be achieved.

When the center wavelength of the laser beam emitted from the femtosecond laser 2 is changed, the wavelength and the incident angle of the laser beam entering the prism 8 are changed. Therefore, the control device 14 controls the incident angle of the laser beam entering the prism 8 according to the center wavelength of the laser beam. More specifically, the control device 14 causes the driving unit 8*d* to rotate the prism 8, and thereby adjusts the incident angle according to the center wavelength of the laser beam. Accordingly, even when the plurality of laser beams having different center wavelengths are selectively used, the light stimulus apparatus 1 can suppress the decrease in the stimulus intensity and the stimulus spatial resolution, and achieve the stable stimulus intensity and stimulus spatial resolution. Also, even when the plurality of laser beams having different center wavelengths are selectively used, the deterioration in the scanning performance of the two-dimensional optical scanner 6 can be also suppressed, and stable scanning performance can be achieved.

The laser beam emitted from the prism 8 enters the AOD 10 through the relay lens 9. The AOD 10 deflects the incident light according to the control signal from outside. The laser beam emitted from the AOD 10 enters the prism 11 arranged adjacent to the emission end of the AOD 10. The prism 11 compensates the angular dispersion of the laser beam emitted from the AOD 10.

The AOD 7 and the AOD 10 are the same except that the deflection surface of the AOD 10 is perpendicular to the deflection surface of the AOD 7 and the rotational axis of the AOD 10 is perpendicular to the rotational axis of the AOD 7. The prism 8 and the prism 11 are also the same except that the rotational axis of the prism 11 is perpendicular to the rotational axis of the prism 8. Therefore, the control device 14 also controls the incident angle on the AOD 10 and the prism 11 according to the center wavelength of the laser beam. To be more specific, the control device 14 adjusts the respective incident angles according to the center wavelength of the laser beam by causing the driving unit 10*d* to rotate the AOD 10 and causing the driving unit 11*d* to rotate the prism 11. Accordingly, even when the plurality of laser beams having different center wavelengths are selectively used, the light stimulus apparatus 1 can always keep the diffraction efficiency of the AOD 10 high. Also, the decrease in the stimulus intensity and the stimulus spatial resolution can be suppressed, and the stable stimulus intensity and stimulus spatial resolution can be achieved.

The laser beam emitted from the prism 11 enters the objective lens 13 through the relay lens 12, is focused and delivered onto the sample S by the objective lens 13.

As described above, with the light stimulus apparatus 1 and the two-dimensional optical scanner 6 according to the present embodiment, high diffraction efficiency and high scanning performance and stimulus performance can be achieved for the plurality of laser beams having different center wavelengths. That is, high diffraction efficiency can be achieved by adjusting the incident angle of the laser beam entering the AOD 7 and the AOD 10 with respect to each wavelength. High scanning performance and stimulus performance can be also achieved by adjusting the incident angle of the laser beam entering the prism 8 and the prism 11 with respect to each wavelength and thereby preventing the beam spot size from becoming larger due to the angular dispersion. Higher stimulus performance can be also achieved by adjusting the amount of negative group delay dispersion caused in the time dispersion compensating mechanism 3 with respect to each wavelength and thereby preventing the beam spot size from becoming larger due to the group delay dispersion. Still higher stimulus performance can be further achieved by reducing the bandwidth by the bandpass filter 5*a* mounted to the filter wheel 5.

What is claimed is:

1. A two-dimensional optical scanner comprising:
   a first acousto-optical deflector that deflects incident light according to a control signal from outside;
   a first driving unit that rotates the first acousto-optical deflector around a rotational axis perpendicular to a first plane including the incident light on the first acousto-optical deflector and emission light from the first acousto-optical deflector;
   a first prism that is arranged adjacent to an emission end of the first acousto-optical deflector and compensates angular dispersion of the emission light from the first acousto-optical deflector;
   a second acousto-optical deflector that deflects incident light according to a control signal from outside;
   a second driving unit that rotates the second acousto-optical deflector around a rotational axis perpendicular to a second plane including the incident light on the second acousto-optical deflector and emission light from the second acousto-optical deflector;
   a second prism that is arranged adjacent to an emission end of the second acousto-optical deflector and compensates angular dispersion of the emission light from the second acousto-optical deflector; and
   a relay lens that allows the emission end of the first acousto-optical deflector and an incident end of the second acousto-optical deflector to be optically conjugate with each other,
   wherein the first acousto-optical deflector and the second acousto-optical deflector are arranged such that the first plane and the second plane are perpendicular to each other.

2. The two-dimensional optical scanner according to claim 1, further comprising:
   a third driving unit that rotates the first prism around a rotational axis perpendicular to the first plane; and
   a fourth driving unit that rotates the second prism around a rotational axis perpendicular to the second plane.

3. A light stimulus apparatus comprising:
   a two-dimensional optical scanner according to claim 2; and
   an ultrashort optical pulse laser that delivers a laser beam to the two-dimensional optical scanner.

4. The light stimulus apparatus according to claim 3, further comprising
   a wavelength selection filter that is arranged in an optical path between the ultrashort optical pulse laser and the two-dimensional optical scanner and transmits light having a wavelength in a predetermined range,
   wherein the wavelength selection filter reduces a bandwidth of the laser beam.

5. The light stimulus apparatus according to claim 4, further comprising:
   a plurality of wavelength selection filters that transmit light having wavelengths in different ranges as the wavelength selection filter; and
   a switching unit that switches the wavelength selection filters arranged in an optical path between the ultrashort optical pulse laser and the two-dimensional optical scanner, wherein the switching unit switches the wavelength selection filters according to a center wavelength of the laser beam emitted from the ultrashort optical pulse laser.

6. A light stimulus apparatus comprising:

a two-dimensional optical scanner according to claim 1; and an ultrashort optical pulse laser that delivers a laser beam to the two-dimensional optical scanner.

7. The light stimulus apparatus according to claim 6, further comprising a wavelength selection filter that is arranged in an optical path between the ultrashort optical pulse laser and the two-dimensional optical scanner and transmits light having a wavelength in a predetermined range, wherein the wavelength selection filter reduces a bandwidth of the laser beam.

8. The light stimulus apparatus according to claim 7, further comprising:

a plurality of wavelength selection filters that transmit light having wavelengths in different ranges as the wavelength selection filter; and a switching unit that switches the wavelength selection filters arranged in an optical path between the ultrashort optical pulse laser and the two-dimensional optical scanner, wherein the switching unit switches the wavelength selection filters according to a center wavelength of the laser beam emitted from the ultrashort optical pulse laser.

\* \* \* \* \*